United States Patent [19]

Shah

[11] Patent Number: 5,140,859
[45] Date of Patent: Aug. 25, 1992

[54] LONG RANGE ULTRASONIC DISTANCE MEASURING SYSTEM

[76] Inventor: Reza H. Shah, 1176 Rutherford Road, Maple, Ontario, Canada, L6A 1S2

[21] Appl. No.: 688,811

[22] Filed: Apr. 22, 1991

[51] Int. Cl.⁵ .............................................. G01S 15/08
[52] U.S. Cl. .................................... 73/597; 367/902
[58] Field of Search ............ 73/597, 620, 627, 290 V, 73/624, 625, 628, 629; 367/127, 129, 902, 903; 364/569

[56] References Cited

U.S. PATENT DOCUMENTS

| | | | |
|---|---|---|---|
| 4,254,478 | 3/1981 | Dumas | 367/902 |
| 4,581,726 | 4/1986 | Makino et al. | 367/902 |
| 4,752,917 | 6/1988 | Dechape | 73/597 |

Primary Examiner—Hezron E. Williams
Assistant Examiner—Rose M. Finley
Attorney, Agent, or Firm—David W. Wong

[57] ABSTRACT

A master transceiver and a slave transceiver are employed for providing an accurate measurement of the distance between two locations in which these transceivers are situated. A pulse signal is generated by the master transceiver, which requires a time period of $t1$ to travel to the slave transceiver. After a time delay of $t2$ upon the receipt of the pulse signal by the slave transceiver it transmits a response signal back to the master transceiver. The response signal requires the same time period of $t1$ to be received by the master trasnceiver. The total time involved is compared with a reference time to distance circuit in the master transceiver to determine the distance between the two units and the distance is shown on a digital display.

10 Claims, 3 Drawing Sheets

LONG RANGE ULTRASONIC DISTANCE MEASURING SYSTEM

BACKGROUND OF THE INVENTION

This invention relates to a distance measuring system and more particularly relates to an ultrasonic system which is applicable for measuring a long distance with high accuracy.

In distance measurement systems, commonly a signal reflection principle is employed. A transmitter is used to generate a signal which is transmitted towards an object of which the distance from the transmitter is to be measured. A reflected signal generally referred to as "echo" is reflected back to the transmitter from the object. The echo is analysed by the transmitter to determine the distance involved. The intensity of the reflected echo in such system is generally relatively low in intensity and it is highly dependent upon the physical property of the object involved. Some objects are highly signal absorptive such that a weak signal, if at all, will be reflected back to the transmitter. Furthermore, the reflected echo can also be corruped by atmospheric conditions such as high humidity and/or other weather conditions. Thus, often the reflected echo back from the object can not provide a satisfactory accurate measurement of the distance involved. The accuracy also progressively decreases as the distance involved increases. For the above reason, heretofore, signal reflection systems have not been satisfactory for measuring object of a relatively far distance away.

Some attempts have been made to increase the intensity of the original signal generated by the transmitter so as to increase the strength of the reflected signal. However, such systems tend to be rather complex in construction and often bulky in weight rendering their application to a very limited scope.

SUMMARY OF THE INVENTION

It is a principal object of the present invention to provide an accurate distance measuring system.

It is another object of the present invention to provide a distance measuring system which is operative for a distance far longer than known systems.

It is another object of the present invention to provide a portable distance measuring system simple in construction such that it has wide applications.

It is yet another object of the present invention to provide a distance measuring system utilizing ultrasonic signals.

It is still another object of the present invention to provide a distance measuring device having a direct distance display.

The system of the present invention operates with the provision of two transceiver units in which one is located at the fixed base location and the other is located at a variable location. Each transceiver unit is operative to generate and transmit an ultrasonic pulse signal that can be received by the other transceiver. The pulse signal generated by the master transceiver located at the base location will transmit to the slave transceiver situated at the selected location in a first time period. Upon receiving the pulse signal, the slave transceiver will, after a predetermined time of delay, generates a response signal which will be received by the master transcevier after a second time period. The summation of the time periods involved is analysed by the master transceiver to provide an accurate measurement of the distance between the master transceiver and the slave transceiver.

BRIEF DESCRIPTION OF THE DRAWINGS

These and other objects of the present invention may be understood by referring to the following specification and drawings in which.

DETAILED DESCRIPTION OF THE PREFERRED EMBODIMENTS

Figure 1:
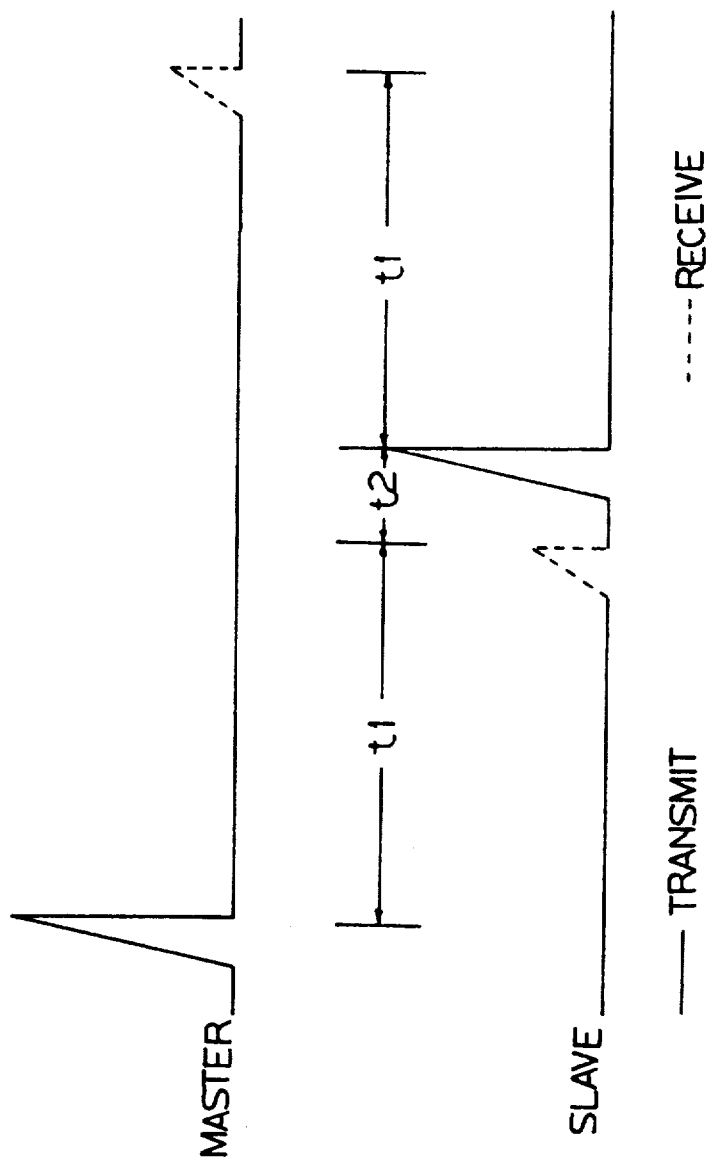
FIG. 1 is an explanatory diagram showing the time and signal characteristics between the master and slave transceivers according to the present invention.

The system according to the present invention will now be described with reference to an exemplary application in which the distance between a base location and a selected variable location is to be measured. A master transceiver is located at the base location and a slave transceiver is located at a selected location. Each transceiver is operative to generate and transmit an ultrasonic pulse signal which can be received by the other transceiver. As illustrated in FIG. 1 the master transceiver is first operated to generate a request pulse signal which after a time period of t1 will be received by the slave transcevier Upon receiving the request pulse signal, the slave transceiver, after a predetermined period of time of delay t2 will generate a response pulse signal which again requires the same time period of t1 to reach the master transceiver. Thus, the total time from the first generation of the request pulse signal from the master transceiver to the receipt of the response pulse signal back to the master transceiver from the slave transceiver is equal to 2t1+t2. The time 2t1 is the measure of twice the distance of the slave transceiver from the master transceiver.

Figure 2:
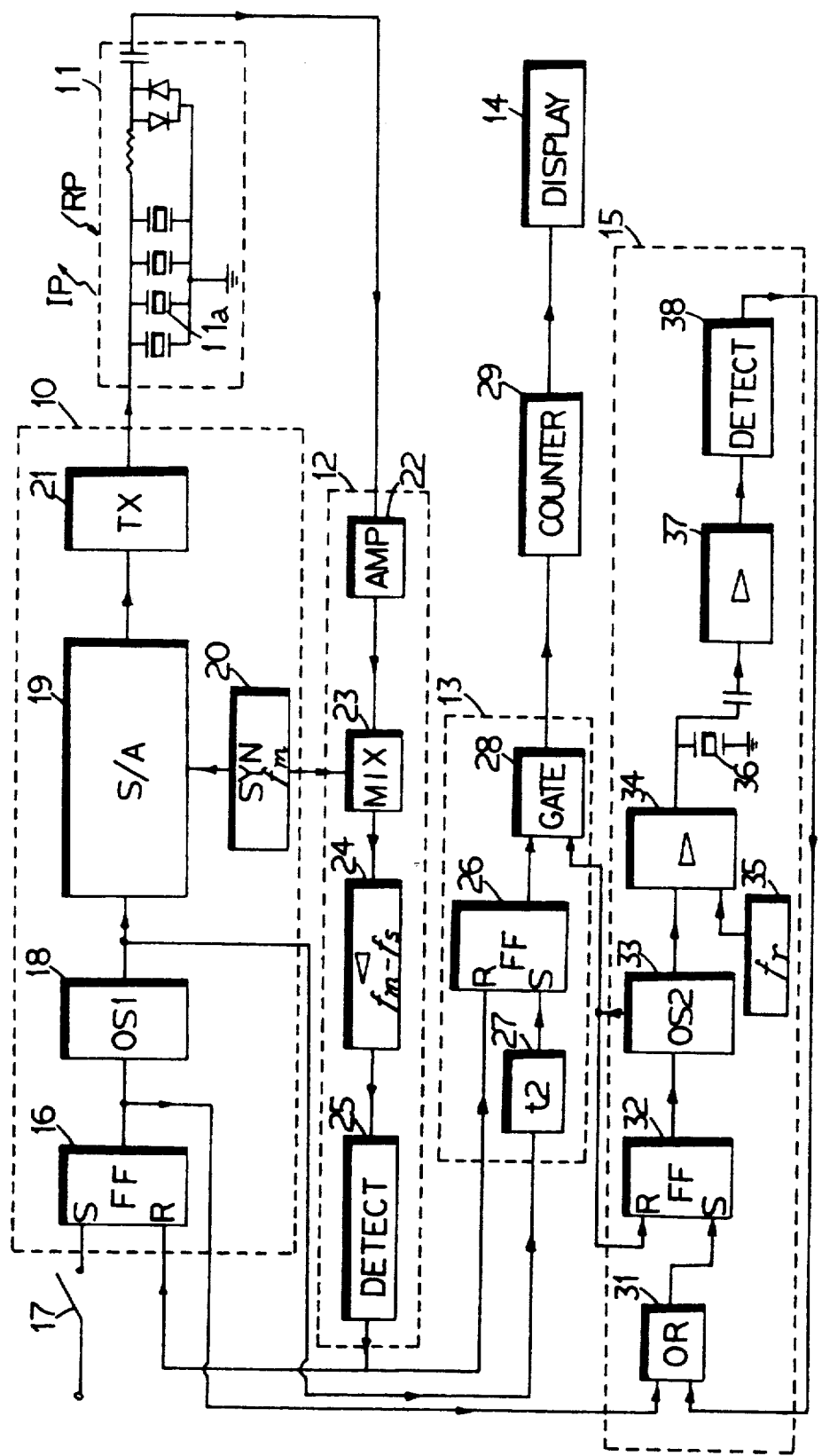
FIG. 2 is a schematic diagram of the master transcevier unit according to the present invention.
Figure 3:
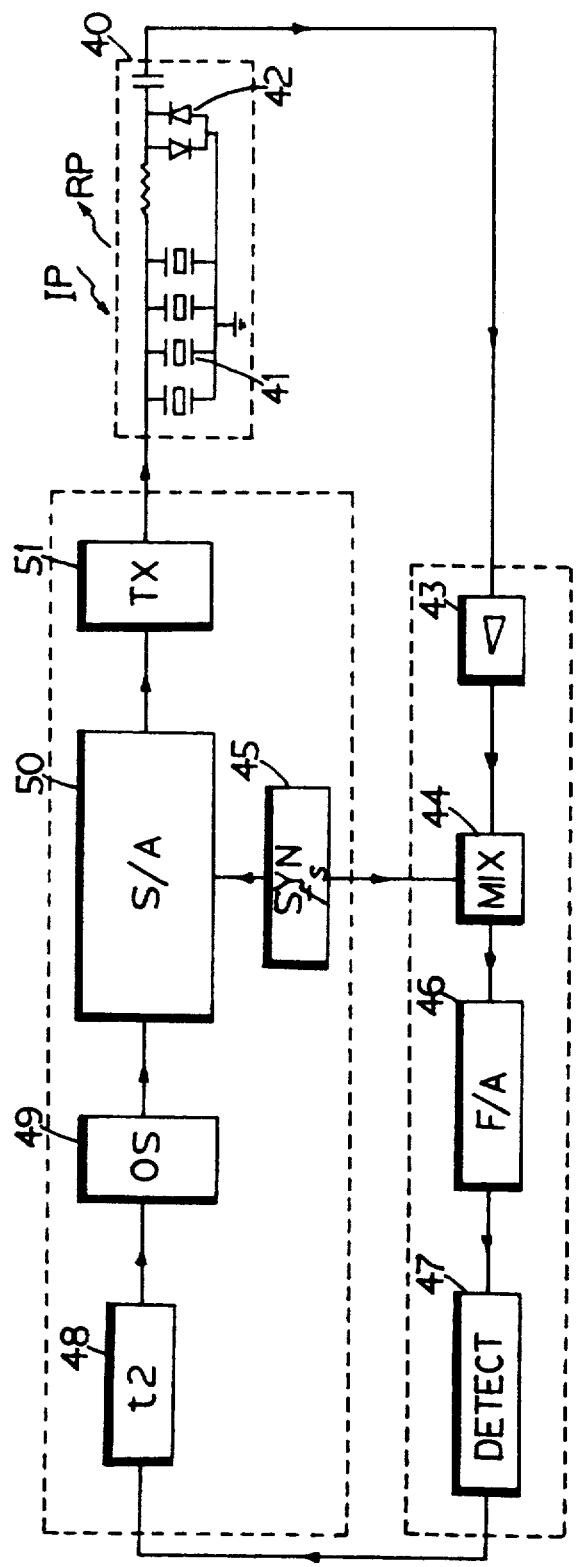
FIG. 3 is a schematic diagram of the slave transcevier unit according to the present invention.

With reference now to FIG. 2, the master transceiver according to the present invention comprises a signal generation circuit means 10, a transducer circuit means 11, a signal receiving circuit means 12, a control circuit means 13, a display means 14 and a reference circuit means 15. The signal generation circuit means 10 includes a flip-flop means 16 which can be actuated by the operation of a power switch 17 to supply a set signal therein such that a pulse signal is generated by the flip-flop means 16. The pulse signal initiates the one shot timer means 18 which governs the pulse width of the pulse signal. The pulse signal is then shaped and amplified by the shape/amplifier means 19 while the frequency fm of the pulse signal is controlled by the synthesizer means 20. The pulse signal is converted into a high voltage pulse signal by a transformer 21 is fed to the transducer means 11 to transmit a high amplitude request pulse signal Ip. Due to the high amplitude of the request pulse signal Ip, a plurality of ultrasonic transducers 11a may be connected in parallel to transform the electric signal into the ultrasonic signal such that a high amplitude ultrasonic request pulse signal having a frequency fm can be transmitted by the transducer means 11. The use of a plurality of ultrasonic transducers 11a in the transducer means 11 enhances the generation of a high intensity ultrasonic pulse signal. Similarly, the use of the plurality of transducers 11a also increases the intensity of the received signal. Moreover, the plurality of transducers also lends the system to the application of multi-channel transmission and reception in which the plurality of frequencies involved require a wide bandwidth characteristics which inherently reduces the efficiency of the transducer. This drawback is obviated by the use of plurality of transducers connected in parallel, so that the intensity of the output signal will be increased so as to compensate for the low efficiency.

When a response signal Rp is received by the transducer means 11, it is fed into the signal receiving circuit means 12 in which the response signal Rp is first amplified by an amplifier 22 Prior to sending the response signal Rp to the amplifier 22, the signal may be modulated by a clipping circuit such as the two parallel connected diodes as shown in FIG. 2 so as to protect the amplifier 22 of high voltage applied to the transducers 11a. The amplified signal is then mixed in the mixer means 23 with the frequency signal having the frequency fm supplied from the synthesizer 20 to provide a signal having the frequency fm-fs which passes through the filter 24 and peak detected by the detector 25. The detector 25 determines the time of occurrence of the trailing edge of the response pulse signal Rp. This trailing edge of the response pulse signal is used to reset the flip-flop means 16 as well as a main timing flip-flop means 26 in the control circuit means 13. The main timing flip-flop means 26 has originally been set by a set signal received from the one shot timer means 18. The set signal is delayed by a time period of t2 by a delay means 27. This time delay of t2 is to compensate for the delay in the transmission of the response signal from the slave transceiver to the master transceiver. Thus, the time at which the main timing flip-flop means 26 is set equal to 2t which is proportional to the distance between the master transceiver and the slave transceiver.

The reference circuit means 15 is provided to convert the time involved into distance. The pulse signal from the flip-flop means 16 is fed to an OR gate 31 which sets the reference flip-flop means 32 to trigger the one shot timer means 33. The operation of the one shot timer means 33 actuates an amplifier 34; in the meantime, an oscillator 35 provides a signal having the frequency fr to the amplified pulse signal. The frequency of fr is preferably different than the frequency fm of the synthesizer means 20, so that there is no interference between the two circuits. Thus, a short burst of a reference pulse signal having a frequency of fr is applied to a reference transducer 36. In the meantime, the trailing edge of the reference pulse signal generated from the one shot timer means 33 is fedback to the flip-flop means 32 to reset the latter. The transducer 36 is mounted inside the enclosure of the master transceiver and is positioned at a predetermined definite short distance from a reference side wall of the enclosure so that the transmission signal generated by the reference transducer 36 will be reflected back to the transducer 36 from the side wall after a time delay of t3. The echo signal is amplified by the amplifier 37 and peak detected by a detector 38 to set the flip-flop means 32 again so that it is ready for a another distance measurement. The firing of the one shot timer means 33 when the flip-flop means 32 is actuated causes the reference circuit means 15 to oscillate at a time period directly proportional to the distance of reflection from the reference side wall to the reference transducer. The reference oscillating signal is gated through gate means 28 into the counter 29 which counts the oscillating time period in the multiples of distance between the reference transducer and the reference side wall. The resultant count is then shown as a digital value by the display 14 to indicate the distance measured.

Openings are provided in the master transceiver enclosure such that the reference circuit means 15 is subject to the same atmospheric ambient condition as the master transceiver and the slave transceiver so as to compensate for any effect the ambient condition may have on the electrical components and/or the transmitted signals.

In the reference circuit means 15, a tri-state CMOS buffer circuit such as CMOS 4503 may be incorporated in the amplifier 34 so that the CMOS buffer circuit will turn on the circuit for the period of the reference pulse transmission, and it will turn off thereafter shortly so that the circuit impedance is high and it is ready to receive the reflected reference signal when it is reflected back from the reference side wall. Furthermore, instead of using a single transducer in the reference circuit means 30, separate transducers may be employed for the function of signal transmission and receiving respectively.

The slave transceiver is primarily similar in construction to the master transceiver except it is not provided with the control circuit means and the reference circuit means. The ultrasonic request pulse signal lp from the master transceiver is received by the transducer means 40 comprising a plurality of transducers 41. The request pulse signal is fed through a limiter circuit 42 to an amplifier 43. The amplified signal is mixed in the mixer 44 with the frequency signal having a frequency fs generated by the synthesizer means 45 in the slave transceiver. The mixed signal is filtered and amplified again by the filter/amplifier means 46 to provide the filtered signal. This filtered and amplified signal is peak detected by detector 47 to provide an actuation pulse signal which is delayed for a period of time t2 in the delay circuit 48 and then used to actuate one shot means 49 so as to generate the response pulse signal Rp. The response pulse signal Rp is shaped and amplified by the shape/amplifier means 50 operating at the frequency of fs. The response pulse signal is then converted to a high voltage pulse signal by the transformer 51 and is applied to the transducer 40 for transmission back to the master transceiver.

It can be appreciated by those skilled in the art that various changes can be made in the present invention without departing from the spirit and scope of the invention. For example, a plurality of slave transceivers may be employed for communicating with a single master transceiver by time slotting the different slave transceivers. Such arrangement not only may be applicable for measurement of distance as described above, but may also be used in a supervisory or monitoring system in which a single master transceiver is located at a central station for monitoring the locations of a plurality of movable objects each of which is equipped with a slave transceiver. The multiple transducers in the transceivers may also be positioned such that they are pointing in all different directions so that their angular sensitivity range in both transmitting and receiving pulse signals would be increased. Moreover, although an ultrasonic system is shown above; however, with the use of different types of transducers, the system is operative with other transmission mediums such as electromagnetic wave, light and microwave.

Obviously numerous modifications and variations of the present invention are possible in light of the above teachings. It is therefore to be understood that within the scope of the appended claims, the invention may be practiced otherwise than as specifically described herein.

What is claimed is:

1. A method of measuring the distance between a first location and a selected variable second location, comprising locating a first transceiver means for transmitting and receiving pulse signals at said first location, locating a second transceiver means for transmitting and receiving pulse signals at said second location, generating a first pulse signal with said first transceiver means for transmitting said first pulse signal to said second transceiver means, generating a second pulse signal at said second transceiver means after a predetermined delay time period upon receipt of said first pulse signal at said second transceiver means, and transmitting said second pulse signal back to said first transceiver means, generating a reference signal at said first transceiver means wherein said reference signal travels through a predetermined distance over a predetermined time period, comparing said predetermined time period of said reference signal with a total time period including transmitting said first pulse signal to said second transceiver means, and said predetermined delay time period and transmitting said second pulse signal back to said first transceiver means so as to determine said distance between said first location and said variable second location.

2. A method of measuring distance according to claim 1 wherein said first pulse signal and said second pulse signal are ultrasonic pulse signals.

3. A method of measuring distance according to claim 2 wherein said reference signal is generated by a reference transceiver means for transmitting and receiving said reference signal having a predetermined characteristics, said reference transceiver means being located in said first transceiver means, and said predetermined distance is a pre-selected short distance between said reference transceiver means and a selected surface within said first transceiver means.

4. A method of measuring distance according to claim 3 wherein said first transceiver means and said second transceiver means comprise a plurality of ultrasonic transducers connected in parallel.

5. A method of measuring distance according to claim 4 including oscillating said reference signal over said total time period in proportion to said predetermined time period for said reference signal to travel over said pre-selected short distance, feeding the oscillating reference signal to a counter means for counting the number of pulses in said reference signal over a predetermined period of time, operating a display means for displaying a visual numerical read out of said number of pulses counted in response to the operation of said counter means whereby displaying a digital value indicating said distance between said first location and second location.

6. A distance measuring system comprising, a first transceiver means for transmitting and receiving pulse signals and located at a first location, a second transceiver means for transmitting and receiving pulse signals and located at a second location, said first transceiver means including a signal generating circuit means for generating an electrical signal, a transducer means for transforming electrical signals into pulse signals for transmission over space medium and operative by said electrical signal to transmit a request pulse signal to said second transceiver means, said second transceiver means being operative upon receipt of said request pulse signal and after a predetermined time delay period generating and transmitting a response signal back to said first transceiver means, signal receiving circuit means for receiving transmitted pulse signals and located in said first transceiver means and operative to generate a second response signal, reference circuit means for generating a reference pulse signal having a predetermined characteristics and located in said first transceiver means and operative in combination with said second response signal to generate an oscillating signal, counter means for counting the number of pulses in a pulse signal and located in said first transceiver means and operative in response to said oscillating signal to actuate a display means for displaying a visual read out and located in said first transceiver means for displaying a digital value indicating the distance between said first location and said second location.

7. A distance measuring system according to claim 6 wherein said first transceiver means includes a flip-flop means and a one shot timer means, said flip-flop means being operative to provide an actuating signal for said one shot timer means for generating a pulse signal, a synthesizer means for providing an oscillating frequency to said pulse signal, said synthesizer means being located in said first transceiver means, transformer means for converting said pulse signal into a high voltage signal for operating said transduce circuit means whereby generating said request pulse signal, said transformer means being located in said first transceiver means.

8. A distance measuring system according to claim 7 wherein said signal receiving circuit means includes an amplifier means for amplifying said response pulse signal received by said transducer circuit means from said second transceiver means, a mixer means for mixing said response pulse signal with the frequency signal generated by said synthesizer means to provide a mixed signal, a detector means for detecting the trailing edge of said mixed signal for resetting said flip-flop means.

9. A distance measuring system according to claim 8 including a clipping means for preventing high voltage from being applied to said amplifier means, said clipping means being connected between said transducer circuit means and said amplifier means.

10. A distance measuring system according to claim 9 wherein said second transceiver means comprises a signal generating circuit means, a transducer circuit means similar to said signal generating circuit means and transducer circuit means in said first transceiver means.

* * * * *